United States Patent [19]
Lochridge

[11] Patent Number: 5,610,798
[45] Date of Patent: Mar. 11, 1997

[54] PERSONAL COMPUTER HOUSING

[76] Inventor: Edwin P. Lochridge, 452 Ridgewood Rd., Atlanta, Ga. 30307

[21] Appl. No.: 445,251

[22] Filed: May 19, 1995

[51] Int. Cl.$^6$ ................. H05K 5/03; G06F 1/16
[52] U.S. Cl. .......................... 361/683; 361/724
[58] Field of Search ................. 361/680, 681, 361/683, 724–727; 312/223.1, 223.2, 223.3; 364/708.1; G06F 1/16

[56] References Cited

U.S. PATENT DOCUMENTS

| | | | |
|---|---|---|---|
| 4,600,249 | 7/1986 | Anderson | 312/196 |
| 4,888,549 | 12/1989 | Wilson et al. | 361/685 |
| 5,450,285 | 9/1995 | Schlemmer | 361/724 |

FOREIGN PATENT DOCUMENTS 404068418  3/1992  Japan ................. G06F 1/16

Primary Examiner—Leo P. Picard
Assistant Examiner—Lynn D. Feild
Attorney, Agent, or Firm—Merchant, Gould, Smith, Edell, Welter & Schmidt

[57] ABSTRACT

A personal computer having a housing which is adapted for cooperation with ergonomically correct furniture. The housing has a parallelpiped configuration, with the two major faces forming the front and back of the parallelpiped. The disk drive and/or CDRom player and controls for the personal computer are disposed on the front of the major face adjacent to top of the housing. Input/output ports for connection with the monitor, keyboard, etc., are disposed on the side of the housing.

19 Claims, 3 Drawing Sheets

PERSONAL COMPUTER HOUSING

BACKGROUND OF THE INVENTION

The present invention is directed to a personal computer housing which is configured to be used in ergonomically progressive environments and to promote the efficient use of space.

Personal computers are increasingly essential tools in modern offices and homes. A typical computer system will include an information entry device for use by the operator to enter information into the system, an information display device for transmitting information to the operator from the system, input/output devices for storage and retrieval of information and processing of instructions or programs, information processing equipment for manipulation of the information input into the system, a chair to support the operator and a desk to support the equipment and, at various times, the operator.

Examples of typical information entry devices include a keyboard, a mouse, a speaker to receive information from the operator in voice form, a digitizing tablet or pad for cooperation with a mouse or puck which can be programmed to run a certain program depending on the position of the mouse or puck when different buttons are activated, and a system involving the interaction of a pen with the screen on some types of monitors. Examples of typical information display devices include a cathode ray screen, a LCD display, a printer and speakers producing sounds. Examples of typical input/output devices include permanent hardware devices such as a hard disk drive and temporary, interchangeable devices such as a floppy disk drive, tape cartridge drive or compact laser disk drive, these temporary, interchangeable devices also exemplifying input/output devices which are operator accessible during normal operation. Examples of typical information processing equipment include a central processing unit or chip, a motherboard which houses the central processing unit, additional processing hardware and slots for installation of additional hardware boards designed to operate with the system, a power supply with exposed power switch, and exposed plugs for connection of wires to interface with the other equipment such as the keyboard, monitor, printer, etc., i.e., input/output ports.

A multitude of chair configurations have been considered for supporting the computer operator in various postures. While conventional thinking recommended an upright posture for the operator, studies have shown that in fact a more reclined posture relieves unnecessary stress on the body, and can provide a healthier and more productive environment.

Similarly, the desks used with computer systems were originally designed with a single, flat, and typically rectangular work surface. More modern designs are intended to overcome problems which result from the introduction of computer systems into this traditional environment. Such modern designs often include more than one support surface, for example, one to hold the monitor at an appropriate level for the operator and a readily-accessible work surface for holding a keyboard. The work surface can be tiltable and/or have an adjustable height.

In early personal computers, all of the system equipment often was housed in a single box for placement on a traditional desktop in front of the operator. As personal computers evolved, it became apparent that it would be advantageous to separate the keyboard and monitor from the box housing the central processing unit, motherboard, disk drives and power supply. This increased the flexibility of the personal computers by permitting the use of different monitors and keyboards. An additional advantage from this change was improved ease of use for the operator, since the keyboard and monitor could be placed in a position in accordance with his or her personal preferences and needs without the need to accommodate the box housing the processing equipment. This improved the health and productivity of computer operators and increased the value of the personal computer as an office tool.

Computer housings typically include a frame which is provided with holes for attachment of standard sized components, including input/output devices (e.g., disk drives, CDRom drives, etc.), motherboards with add-on board and memory slots and CPU chips, and power supplies. A removable shell is attached to the frame, which protects the components while allowing access to plugs, controls and input/output devices, and which may provide necessary shielding from electromagnetic forces.

Personal computer housings are generally designed in a parallelpiped shape, with the major faces of the parallelpiped being oriented as the top and the bottom of the housing. This design harkens to the original personal computer configurations, under an apparent assumption that many operators will desire to place the monitor on top of the housing. Thus, the slots for inserting disks into the interior of the disk drives, etc., are located on a front edge face of the parallelpiped so that the operator can insert the disks into the system. The plugs for connection of input/output devices are usually disposed at the rear edge face. The power switch for the computer often is also located at the rear of the parallelpiped with the plugs, due to the fact that the power supply is usually placed at the rear with a fan for removal of heat from the system. Sometimes, the power switch is located at the front of the box to improve the accessibility of the switch for the operator. This design is problematic in that studies have shown that health and productivity factors suggests that the level of the monitor should be lowered, contradicting the underlying premise of this housing design. In addition, this housing design is not well-suited for use with the more modern, ergonomically-correct office furniture coming into more common use.

Another design for the personal computer housing is the so-called "tower" configuration. In this design, the housing is placed on the floor next to the desk, beneath the desk or in an upright position on the desktop. The disk drives and power controls in this design are located at one end of the forward face of the parallelpiped in an "over and under" configuration. The plugs are again found in the rear of the system. In this design, the major faces of the parallelpiped are the sides of the housing. This design occupies a smaller amount of valuable work surface space in comparison with the design discussed previously since it can be placed on the floor. In addition, this design does not require a raised level for the monitor. However, this design is not readily accessed by the operator from a relaxed and healthy posture. In addition, this design is not well-suited for use with ergonomically-correct furniture. In addition, the personal computer can be subjected to undesirable abuse due to its resting on the floor, for example, during office cleaning operations.

Studies have suggested that the health and productivity of office workers using personal computers could be improved if the furniture is designed to promote more of a reclined position, as opposed to the upright position which has long-been advocated. However, the more reclined posture is disadvantageous to the extent that it requires a greater amount of floor space. To minimize the adverse effects from this increased requirement for floor space for the operator, it would be desirable to reduce the space requirements for the furniture and equipment, of course without sacrificing productivity.

SUMMARY OF THE INVENTION

The present invention provides a personal computer whose housing is designed to cooperate well with the new generation of ergonomically correct furniture. The housing of the present invention can be located off of the floor, for example, secured on or underneath a shelf. The housing can be located so as to not encumber the foot and leg space of the operator or impede the operator's movement, while still permitting easy access to power controls, disk drives, etc., by the operator from a suitable posture with minimal reaching or stretching. The housing permits easy access to the connecting plugs without the need for movement of the computer or furniture. The housing design of the present invention is readily used with current standard hardware components, and could be used to reconfigure equipment found in traditional housing designs. Thus, the present invention will ease the adoption of new computer work station designs and thereby improve the health and productivity of those using computers.

The present invention provides a personal computer whose housing is oriented in an upright position. The housing is parallelpiped in nature, and the major faces of the parallelpiped are the front and back. The operator-accessible input/output devices (e.g., disk drive and CDRom player) and/or controls are disposed on the front of the major face of the housing, adjacent the top of the housing. The input/output devices extend from the front major face in the direction of the back major face of the housing. Input/output ports and/or the plug for the personal computer are disposed on one of the side faces of the housing.

Since the disk drive, CDRom player and/or controls are located on one of the major faces of the housing, the housing is relatively shallow, and can easily be secured on or under a narrow shelf. This reduces the amount of space needed between the furniture and the wall, and also prevents the computer from intruding into the operator's leg and foot space. By placing the disk drive, etc., near the top of the housing, it is possible for these items to be located above the level of the operator's work surface, permitting the operator to have easy access to them, but without occupying valuable space on the work surface. The location of the input/output ports and/or plug of the side face of the housing improves the access to those items without the need for moving the computer housing or moving the furniture on which it is located, and again reduces the amount of space needed between the furniture and the wall.

DETAILED DESCRIPTION

Figure 1:
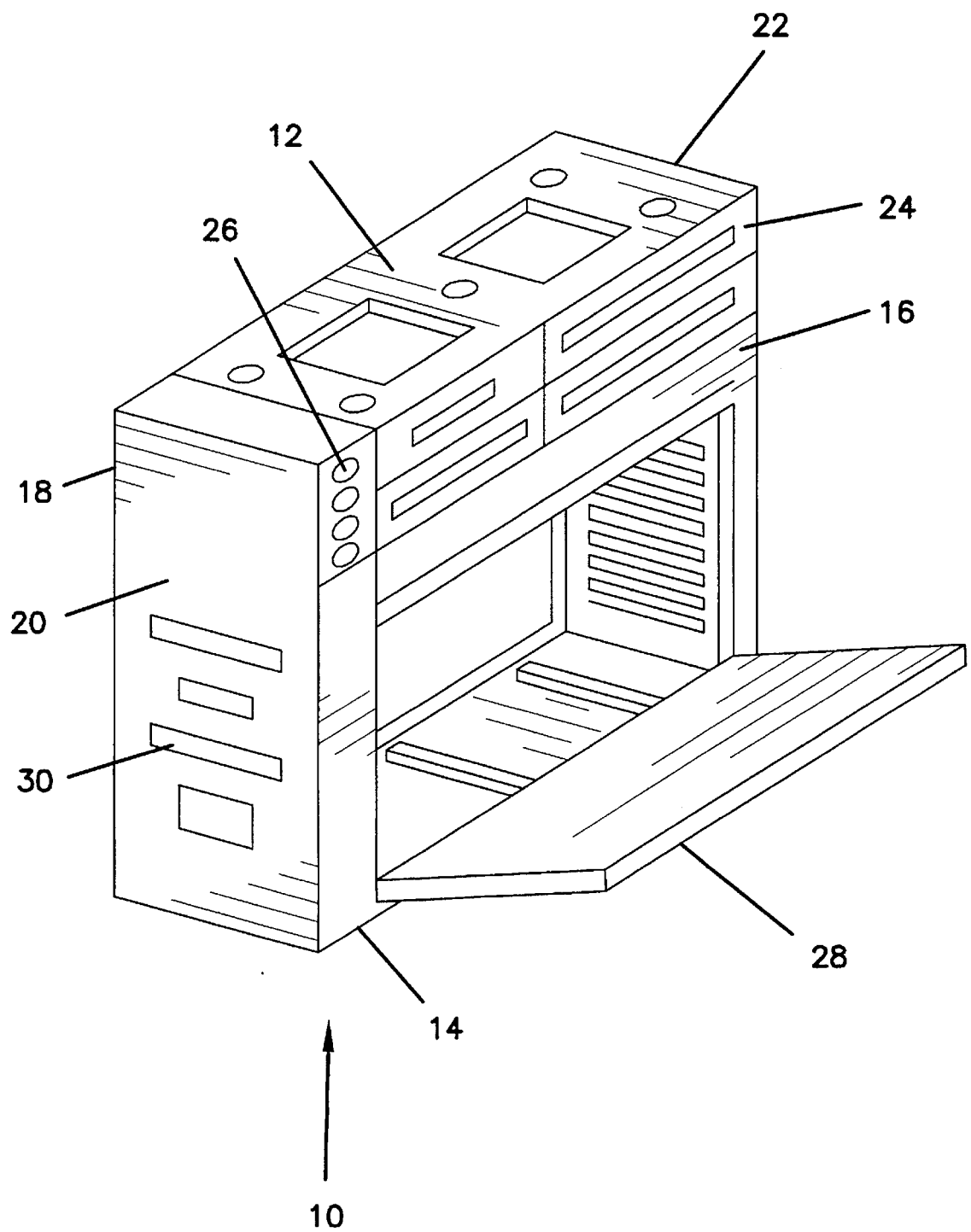
FIG. 1 is a perspective view of the personal computer housing according to the present invention.
Figure 2:
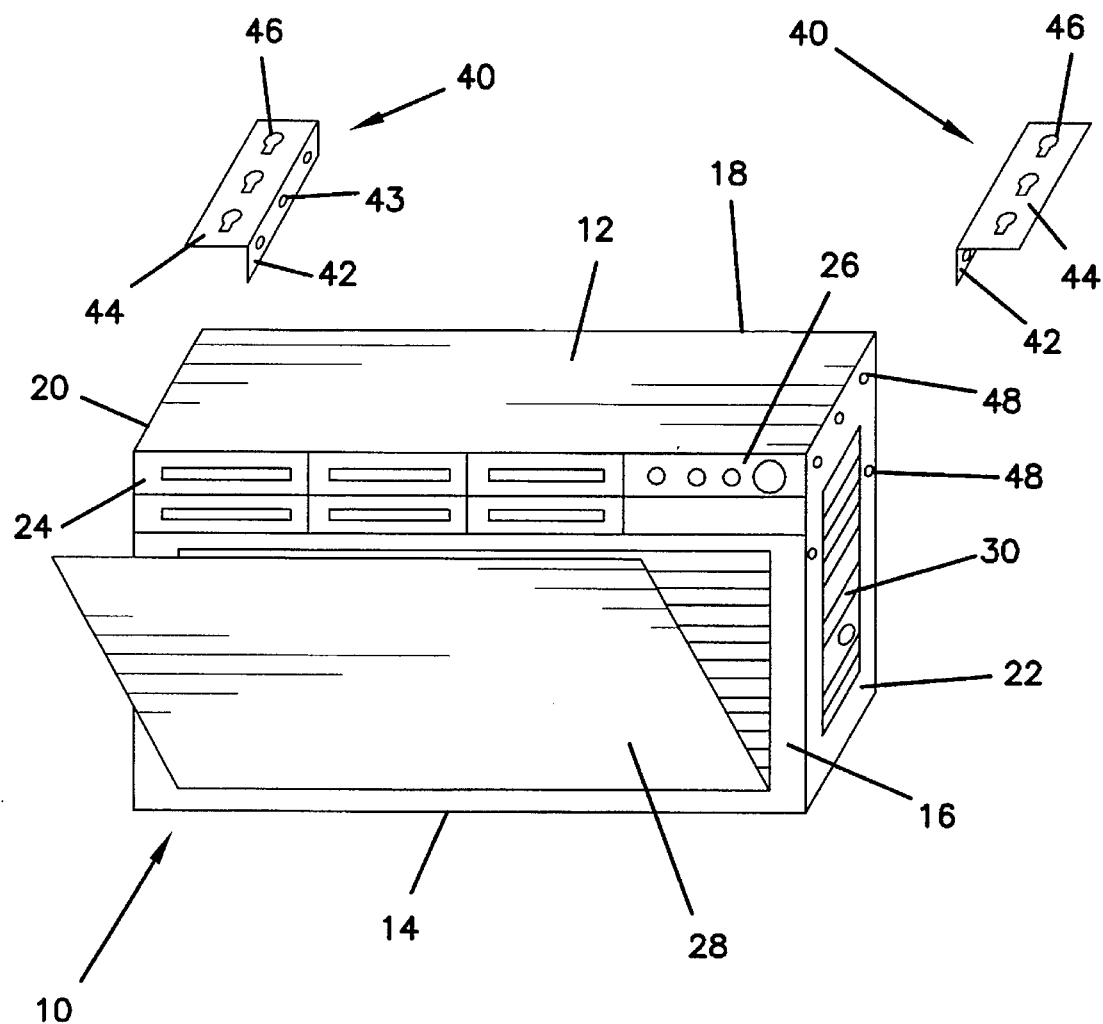
FIG. 2 is a perspective view showing details of a system to permit the securing of the personal computer of the present invention to a shelf.

Referring to FIGS. 1 and 2, the personal computer housing 10 of the present invention is in the shape of a parallelpiped. The housing 10 has opposed top and bottom faces 12 and 14 respectively. Major faces 16 and 18 form the front and back of the housing, respectively. Faces 20 and 22 form the sides of the housing. While the two housings depicted are not identical, they share similar features, and thus the same reference numerals are used to identify corresponding features in each figure.

It is preferred that the two opposed major faces 16 and 18 be separated by a distance of no more than about 8.5 inches. That is, the "width" of the side faces 20 and 22 is no more than about 8.5 inches (about 21 cm). This is the current depth of a standard disk drive component. As the size of standard disk drive components is reduced, this dimension can be reduced. In fact, it is contemplated that the dimensions of the present housing will be modified as the standards for various components are changed. However, it is contemplated that the changes will follow the changes in standards, not only in overall dimensions, but also, e.g., locations for holes for attachments of drives, motherboards, etc.

It is preferred that the top 12 and bottom 14 be separated by a distance of at least 15 inches (about 37 cm). That is, the "height" of the major faces 16 and 18 forming the front and back is at least 15 inches. It is also preferred that the two opposed side faces 20 and 22 be separated by a distance of at least 15 inches (about 37 cm). That is the "width" of the major faces 16 and 18 is at least 15 inches. These dimensions provide an interior volume similar to that of current personal computer housings, and again, this permits the ready use of standard components with the housing of the present invention.

The operator-accessible input/output devices (e.g., disk drives, CDRom players, etc.) 24 for the personal computer are located on the major face 16 forming the front of the personal computer housing. These are located adjacent the top of the housing, and more than one row can be provided if necessary to accommodate the disk drive and/or CDRom players. The disk drive and/or CDRom player extends in a direction from front face 16 toward face 18. Similarly, the controls 26 for the personal computer can be located on front face 16, adjacent the top. The controls can include, for example, the power switch for the personal computer.

The housing can be provided with a hinged door 28 to permit access to the interior of the personal computer, to allow replacement/repair of the motherboard, installation/removal of add-on boards, etc. This may be advantageously located on the front face 16.

The input/output ports for connecting the personal computer with a monitor, keyboard, etc., are disposed on one of the side faces. The plug for connecting the personal computer to a power source can also be positioned on the side face. This allows easy access to these items without the necessity of moving the housing. This convenient access also permits the better management and/or concealment of the wires. It should be recognized that all of the input/outputs need not be located on the same side face. For some applications, it might be more convenient to have some ports on one side face and others on the other side face.

FIG. 2 illustrates an adaptation permitting the housing to be secured to a shelf or desk. Angle bars 40 have a vertical leg 42 and horizontal leg 44. The side face of the housing has holes which permit the vertical leg 42 of the angle bar 40 to be secured to the housing, for example with screws. The horizontal leg 44 permits the computer to be mounted on a shelf, etc. The horizontal leg 44 can be provided with openings such as the illustrated key hole openings 46, which permit the computer to be secured to a shelf, etc. For example, to mount the computer on the underside of a shelf, the angle bars will be attached at the tops of the side faces of the computer housing, for example with screws through aperture 43 in leg 42 into apertures 48 in the housing. The computer can then be mounted on the underside of a shelf by means of screws which pass through and engage keyhole openings 46. The keyhole shape is particularly useful, since it permits the computer to be readily removed and then remounted without the need to remove the screws from the underside of the shelf.

Figure 3:
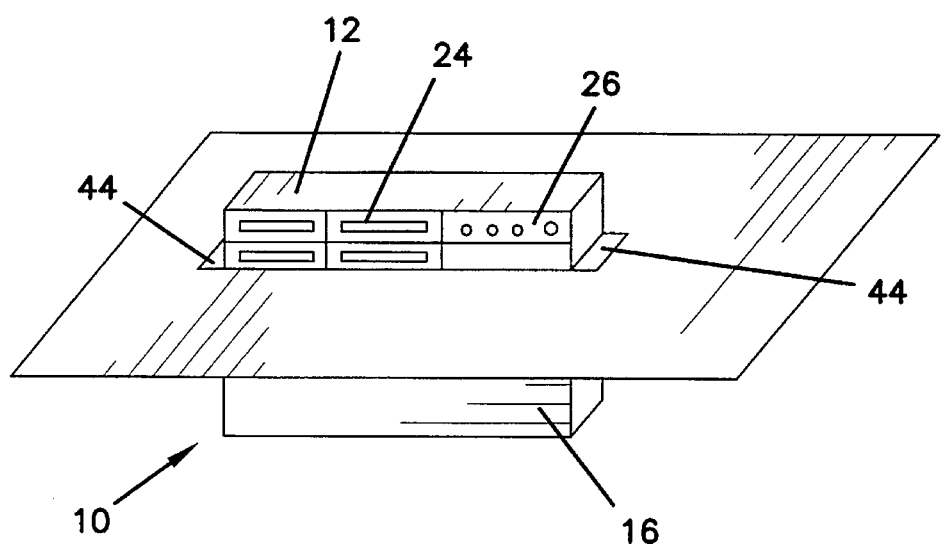
FIG. 3 is a perspective view showing a personal computer of the present invention installed in an opening in a shelf.

The computer can also extend through a shelf or desktop, as seen in FIG. 3. In this case, the angle bars 40 are attached to the side faces at a location intermediate the top and bottom, preferably at about the lowermost level of the input/output devices 24 (e.g., the location of the lower set of apertures 48 in FIG. 2). The computer can then be dropped through an opening in a shelf or desktop, etc., to rest on the horizontal legs 44. Attaching the horizontal legs to the shelf or desktop by means of screws through apertures 46 can be carried out if necessary. It can be seen that the operator-accessible input/output devices and regularly-accessed controls will be conveniently located above the upper surface of the shelf or desktop, while the rest of the computer will be "out of the way", below the shelf or desktop.

Figure 4:
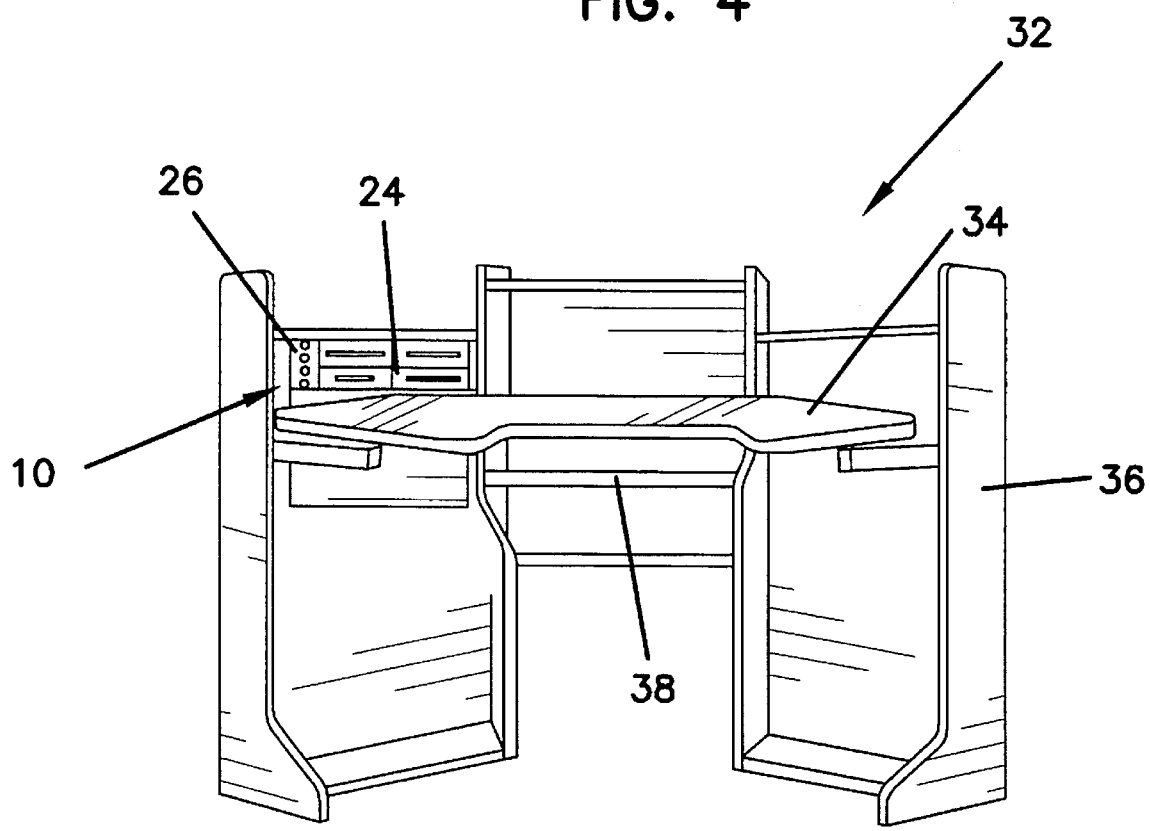
FIG. 4 is a front view of computer work station in which a personal computer of the present invention has been installed.

FIG. 4 illustrates the use of the personal computer of the present invention in connection with an ergonomically-designed work station. The present invention is particularly useful with a workstation known as the POWER STATION®, available from Metamorphosis Design & Development, Inc. of Atlanta, Ga. The workstation 32 includes a tiltable work surface 34 and a stand 36 which carries the work surface. The stand is located opposite the position which would be occupied by the operator and generally surrounds the work surface. The stand could be provided with a number of shelves for holding books, a lamp, a telephone, etc. The monitor for the personal computer will generally be located in middle section 38 on a shelf. The keyboard will be located on the work surface 34.

The personal computer 10 of the present invention can be secured on or underneath a shelf on stand 36, or can extend through a shelf or desktop in a manner similar to that shown in FIG. 3, as discussed above. The arrangement of the disk drives, etc., at the top of the front face of the housing allows the disk drives, etc., to be disposed at a level which is above the level of the work surface 34. The orientation of the housing with the major faces being the front and back provides a shallow configuration which permits the personal computer to be located on a relatively narrow shelf, without intruding into the foot and leg space of the operator and without extending significantly beyond the perimeter of the stand 36. This in turn permits the stand to be placed closer to a wall, thereby reducing the consumption of valuable floor space. This is also facilitated by the location of the input/output ports and plug on the side of the housing. This permits easy access to these items without having to move the housing or to move the furniture to gain access to the rear face of the housing, where such features generally have been mounted. It also should be noted that the stand 36 could be designed with channels or housings for wires which would keep the wires out of the way of the operator. In this regard, it is preferable to locate the input/output ports and plugs so that in use they will be disposed below the level of the work surface 34.

It should be noted that it might be possible to separate the disk drives and power controls in a separate housing from the rest of the personal computer, which would permit the two to be placed in different locations. However, this would require the use of relatively expensive shielded connecting wires to comply with FCC and UL regulations.

Although a detailed description of the present invention has been provided above, the present invention is not limited to the specific embodiments described herein, but rather is defined by the claims which will follow.

What is claimed is:

1. A personal computer, comprising:
   a housing which comprises:
      a top;
      a bottom;
      two opposed major faces extending between the top and the bottom; and
      two opposed side faces extending between the top and the bottom and between the two opposed major faces, each of the major faces having an area greater than the area of any of the top, bottom or side faces; and
   at least one input/output device disposed on one of the major faces of the housing adjacent the top of the housing, said input/output device extending from said one of the major faces of the housing in the direction of the other of the major faces of the housing.

2. The personal computer of claim 1, further comprising a control for the personal computer disposed on said one of the major faces of the housing adjacent the top of the housing and at least one plug or input/output port disposed on one of the side faces of the housing.

3. The personal computer of claim 1, wherein the two opposed major faces are separated by a distance consistent with the depth of standard input/output devices.

4. The personal computer of claim 3, wherein the distance is no more than about 8.5 inches.

5. The personal computer of claim 3, wherein the top and bottom are separated by a distance sufficient to allow installation of standard motherboards, power supplies and add-on cards.

6. The personal computer of claim 4, wherein the top and bottom are separated by a distance of at least about 15 inches.

7. The personal computer of claim 6, wherein the two opposed side faces are separated by a distance of at least about 15 inches.

8. The personal computer of claim 1, wherein the input/output devices include at least one selected from the group consisting of disk drives and CDRom players, and all of the disk drives and cd rom players of the computer are disposed on said one of the major faces of the housing adjacent the top of the housing and extend from said one of the major faces of the housing in the direction of the other of the major faces of the housing.

9. The personal computer of claim 2, wherein all of the controls for the personal computer requiring user access on a regular basis are disposed on said one of the major faces of the housing adjacent the top of the housing.

10. The personal computer of claim 1, wherein the area of each of the major faces is at least 1.76 times greater than the area of any of the top, bottom or side faces.

11. A personal computer in combination with a work station, the work station comprising:
   a work surface; and
   a stand located at the perimeter of the work surface at a position remote from a position occupied by a user of the workstation;

the personal computer being carried by the stand and comprising:
- a housing which comprises:
  - a top;
  - a bottom;
  - two opposed major faces extending between the top and the bottom; and
  - two opposed side faces extending between the top and the bottom and between the two opposed major faces, each of the major faces having an area greater than the area of any of the top, bottom or side faces; and
- at least one input/output device disposed on one of the major faces of the housing adjacent the top of the housing, said input/output device extending from said one of the major faces of the housing in the direction of the other of the major faces of the housing, the personal computer being located so that said at least one input/output device is located at a position above the level of the work surface so that a user of the work station can access said at least one said input/output device from above the work surface.

12. A computer housing, comprising:
- a parallelpipedic shell;
- a frame within the shell;
- said shell comprising:
  - a top;
  - a bottom;
  - two opposed major faces extending between the top and the bottom;
  - two opposed side faces extending between the top and the bottom and between the two opposed major faces, each of the major faces having an area greater than the area of any of the top, bottom or side faces; and
  - one of the major faces being provided with at least one aperture for accepting an input/output device, disposed adjacent the top of the shell.

13. The computer housing of claim 12, wherein one of the side faces is provided with at least one aperture for accepting a plug or an input/output port.

14. The computer housing of claim 12, wherein the area of each of the major faces is at least 1.76 times greater than the area of any of the top, bottom or side faces.

15. The computer housing of claim 12, wherein the two opposed major faces are separated by a distance no more than about 8.5 inches.

16. The computer housing of claim 15, wherein the top and bottom are separated by a distance of at least about 15 inches.

17. The computer housing of claim 16, wherein the two opposed side faces are separated by a distance of at least about 15 inches.

18. A personal computer in combination with a work station, the work station comprising:
- a work surface; and
- a stand located at the perimeter of the work surface at a position remote from a position occupied by a user of the workstation;
- the personal computer being carried by the stand and comprising:
  - a housing which comprises:
    - a top;
    - a bottom;
    - two opposed major faces extending between the top and the bottom; and
    - two opposed side faces extending between the top and the bottom and between the two opposed major faces, each of the major faces having an area greater than the area of any of the top, bottom or side faces; and
  - a control for the personal computer disposed on said one of the major faces of the housing adjacent to the top of the housing and at least one plug or input/output port disposed on one of the side faces of the housing; and
- at least one input/output device disposed on one of the major faces of the housing adjacent the top of the housing, said input/output device extending from said one of the major faces of the housing in the direction of the other of the major faces of the housing, the personal computer being located so that said at least one input/output device is located at a position above the level of the work surface so that a user of the work station can access said at least one said input/output device from above the work surface.

19. The combination of claim 18, wherein the plug or input/output port of the personal computer is located below the level of the work surface.

* * * * *